(12) United States Patent
Nebeker et al.

(10) Patent No.: US 7,448,822 B2
(45) Date of Patent: Nov. 11, 2008

(54) RETAINING MEMBER AND METHOD FOR USE WITH A SEAT TRACK

(75) Inventors: Michael O Nebeker, Everett, WA (US); Matthew S Olson, Everett, WA (US); Anthony E Anderson, Mill Creek, WA (US); James E Ebner, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 296 days.

(21) Appl. No.: 11/376,682

(22) Filed: Mar. 15, 2006

(65) Prior Publication Data

US 2007/0215769 A1   Sep. 20, 2007

(51) Int. Cl.
*F16B 21/06* (2006.01)

(52) U.S. Cl. .................. 403/329; 403/326; 244/118.6; 24/580.1; 24/581.1

(58) Field of Classification Search .................. 403/326, 403/329, 331, 353; 244/118.5, 118.6; 24/291, 24/292, 458, 580.1, 580.11, 581.1, 581.11
See application file for complete search history.

(56) References Cited

U.S. PATENT DOCUMENTS

| | | | |
|---|---|---|---|
| 3,905,712 A * | 9/1975 | McConnell | 403/317 |
| 5,291,843 A * | 3/1994 | Hori | 403/329 |
| 5,350,074 A * | 9/1994 | Rosenband | 211/192 |
| 5,618,124 A * | 4/1997 | Chen | 403/329 |
| 6,227,491 B1 | 5/2001 | Stephan et al. | |
| 6,241,109 B1 * | 6/2001 | Kautz et al. | 403/329 |
| 6,669,149 B2 | 12/2003 | Akizuki | |
| 7,264,321 B1 * | 9/2007 | Bueley et al. | 312/265.5 |

FOREIGN PATENT DOCUMENTS

| | | |
|---|---|---|
| GB | 481493 | 3/1938 |
| GB | 877482 | 9/1961 |

OTHER PUBLICATIONS

UK Intellectual Property Office combined search and exam report under 17 and 18(3) for Application No. GB0704935.6 dated Jul. 11, 2007.
Unirak, product information page for "Unirak—Why Choose Unirak?," http://www.unirak.com/HTML/yunirak.html (1 Page).

* cited by examiner

*Primary Examiner*—Michael P Ferguson
(74) *Attorney, Agent, or Firm*—Harness, Dickey & Pierce, P.L.C.

(57) ABSTRACT

A retaining component for securing an external structure or panel to a seat track within a mobile platform, such as an aircraft. The retaining component includes a pair of flexible flanges that are adapted to engage an external component or panel, in one example a seat track in a commercial aircraft cabin area. The retaining component also includes a base portion having a flexible portion with at least one locking tab protruding therefrom. One or more hook-shaped engaging tabs also protrude from the base portion. The engaging tabs and the locking tab enable the retaining component to be secured to a flange of a seat track having a plurality of spaced apart holes in a manner that does not require any external threaded or rivet style fastening elements, or the use of separate assembly tools. The retaining component, in one form, is a single piece, lightweight, integrally formed component that is ideally suited for use in mobile platforms such as commercial aircraft where assembly time and costs are important considerations in the manufacture of a commercial aircraft.

16 Claims, 2 Drawing Sheets

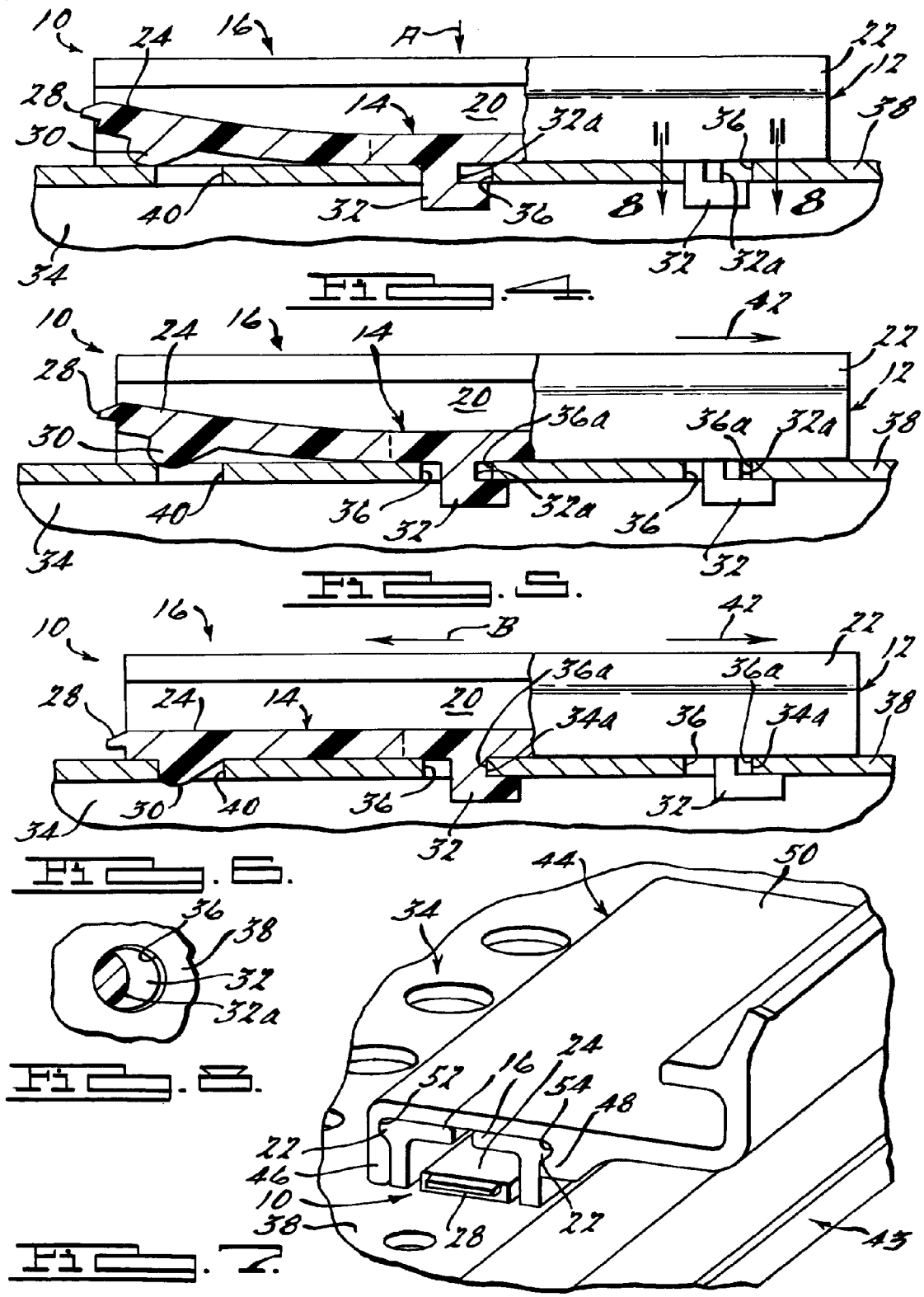

RETAINING MEMBER AND METHOD FOR USE WITH A SEAT TRACK

FIELD

The present disclosure relates to retaining components, and more particularly to a one piece retaining component for securing a member or panel to a seat track on a mobile platform such as a commercial aircraft.

BACKGROUND

Seat tracks are used in a wide variety of mobile platforms to secure seats and various interior decorative panels, located in proximity to the seat track, in a secure position. Typically the external component (i.e., panel, structure or member adjacent the seat track) is secured to the seat track via a plurality of fasteners that extend through one or more holes in the seat track. The seat track itself is typically secured fixedly to a floor portion of the mobile platform and typically includes a plurality of seats that are fixedly secured to it (usually in a plurality of rows). In one specific application, a mop sill panel in a commercial aircraft is typically secured via a plurality of rivet style fasteners, or threaded fasteners, to a plurality of corresponding holes in a flange of the seat track. The mop sill panel is a decorative panel that is positioned near the floor in the cabin area of the aircraft, and along a wall portion of the cabin. The process of using rivet style fasteners or threaded fasteners to secure the mop sill panel, or any other component to the seat track, is time and labor intensive. Significant labor time and effort is required to secure numbers of rivet style or threaded fasteners that are typically used to secure the mop sill panel to a flange portion of the seat track. This adds to the cost associated with assembly of the aircraft.

Accordingly, it would be highly desirable to provide some means of quickly and easily attaching an external component, structure or panel, for example a mop sill panel in a commercial aircraft cabin interior, to a seat track mounted on a floor of the mobile platform, without the use of multiple threaded fasteners or rivet style fasteners. More preferably, it would be highly desirable to provide some component that can be used as an interface to quickly and easily attach a variety of independent panels, components or structural panels to a portion of a seat track, without the use of any external tools or fastening members, and without interfering with attachment of the seats to the seat track.

SUMMARY

The present disclosure is directed to a retaining component and method for retaining external panels or members to a fixedly mounted component, for example a seat track. In one exemplary implementation the seat track is used on a mobile platform, for example a commercial aircraft. However, the retaining component can be used to help secure a variety of structural panels, components or structures to a seat track, whether the seat track is used in a fixed location or on a mobile platform such as a bus, train, ship, etc.

In one implementation the retaining component includes a main body that forms part of a single piece component. The main body includes a pair of flexible flanges and a base portion that the flanges extend from. The flanges and base portion cooperatively form a channel. The base portion also includes a flexible portion. The base portion includes at least one engaging tab and at least one locking tab, with the locking tab formed on the flexible portion. The locking tab and engaging tab are spaced apart generally approximately in accordance with the spacing of the holes in the structure to which the retaining component is being secured. In one exemplary implementation, the retaining member is used in connection with a seat track on a commercial aircraft. In this instance, the engaging tab and locking tab are spaced apart generally in accordance with a plurality of holes formed in a flange of the seat track, but not perfectly in accordance with the hole spacing in the seat track. In one implementation the main body is formed from plastic, and the engaging tab has a hooked shape, with the hooked shape defining a hook able to grab an edge of one of the holes in the seat track.

In use, the retaining component is secured to the seat track by placing the base portion over a selected plurality of the holes in the seat track. The engaging tab preferably has a hooked shape that is placed in one of the holes in the seat track. Sufficient pressure is exerted on the main body, typically with the thumb and fingers of one hand, to hold it against the surface of the flange of the seat track. This causes the flexible portion, with the locking tab protruding therefrom, to flex as the base portion is pushed against, and held against, the surface of the flange of the seat track. The main body is then slid longitudinally a small distance until the locking tab snaps into a different hole in the seat track. At this point the hooked engaging tab engages the edge of the hole in which it has been placed, and its hooked shape prevents the main body from being lifted off of the seat track. The locking tab prevents the main body from being moved longitudinally in one direction or the other. Lastly, a portion of the decorative independent panel or member is pressed over the flexible flanges, or alternatively into the channel in between the flexible flanges, to snappingly engage with the flexible flanges. The order of these steps may be reversed, that being that the independent member or panel may be first attached to the retaining component, and then the retaining component attached to the seat track.

In one preferred implementation the flexible portion is formed by a pair of parallel slits that extend from one edge of the base portion, with the locking tab formed on the base portion between the slits.

It is a principal advantage of the retaining component that it eliminates the need for external fastening elements to secure the external panel or structure to the seat track. Thus, various external panels or structures can be quickly and easily secured without fasteners, and without external tools, by the use of the retaining component described in the present disclosure.

Further areas of applicability of the present disclosure will become apparent from the detailed description provided hereinafter. It should be understood that the detailed description and specific examples, while indicating various embodiments, are intended for purposes of illustration only and are not intended to limit the scope of the present disclosure.

BRIEF DESCRIPTION OF THE DRAWINGS

The present disclosure will become more fully understood from the detailed description and the accompanying drawings, wherein:

FIG. 4 is a side cross sectional view of the retaining component partially engaged with a seat track of a mobile platform, for example, an aircraft;

FIG. 5 is an illustration of the retaining component of FIG. 4 after the retaining component has been slid longitudinally a small degree to the right in the drawing of FIG. 5;

FIG. 6 illustrates the retaining component of FIG. 4 fully engaged in the openings in the seat track;

FIG. 7 illustrates a mop sill panel of a commercial aircraft engaged with the flexible flanges of the retaining component; and FIG. 8 is a section according to section line 8-8 in FIG. 4 of the cross-sectional shape of a leg portion of one of the engaging tabs.

DETAILED DESCRIPTION

The following description of various embodiment(s) is merely exemplary in nature and is in no way intended to limit the present disclosure, its application, or its uses.

Figure 1:
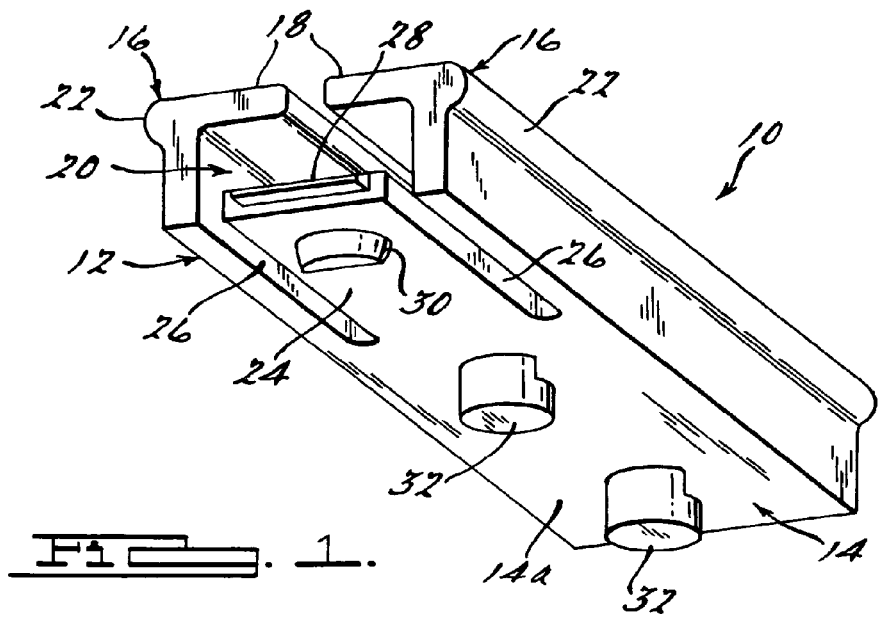
FIG. 1 is a perspective view of one embodiment of a retaining component in accordance with the present disclosure.

Referring to FIG. 1, there is shown a retaining component 10 in accordance with one embodiment of the present disclosure. The retaining component 10 has a main body 12 that is preferably formed as a single piece component. In one implementation the main body 12 is formed from plastic, and more preferably from a high strength plastic, for example nylon. However, the main body 12, and essentially the entire retaining component 10, could be formed from any suitably strong and lightweight material. However, it is anticipated that injection molding the retaining component 10 from a high strength plastic will be a particularly preferred form of manufacture.

The main body 12 includes a base portion 14 having a pair of flexible flanges 16 extending therefrom. The flanges 16 include a pair of co-planar ledges 18 that between them define an opening leading into a channel 20. Accordingly, the channel 20 is formed in part by the flanges 16, the ledges 18 and the base portion 14. In one implementation the flanges 16 include profiled edges 22 that assist in securing an external structure or panel over the flanges 16. Of course, depending upon the shape of the external structure or panel, it may be disposed such that a portion thereof is engaged over the flanges 16, or alternatively so that a portion thereof projects into the interior area of the channel 20 and is captured therein by the ledges 18. Both arrangements for securing an external component or panel are contemplated with the retaining component 10.

Figure 2:
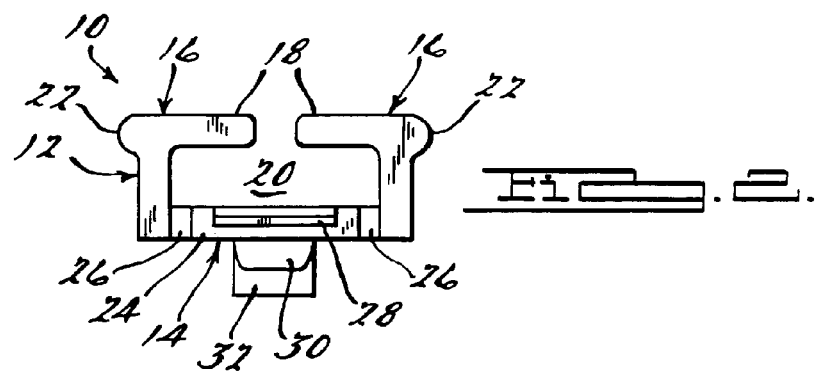
FIG. 2 is a front view of the retaining component of FIG. 1.
Figure 3:
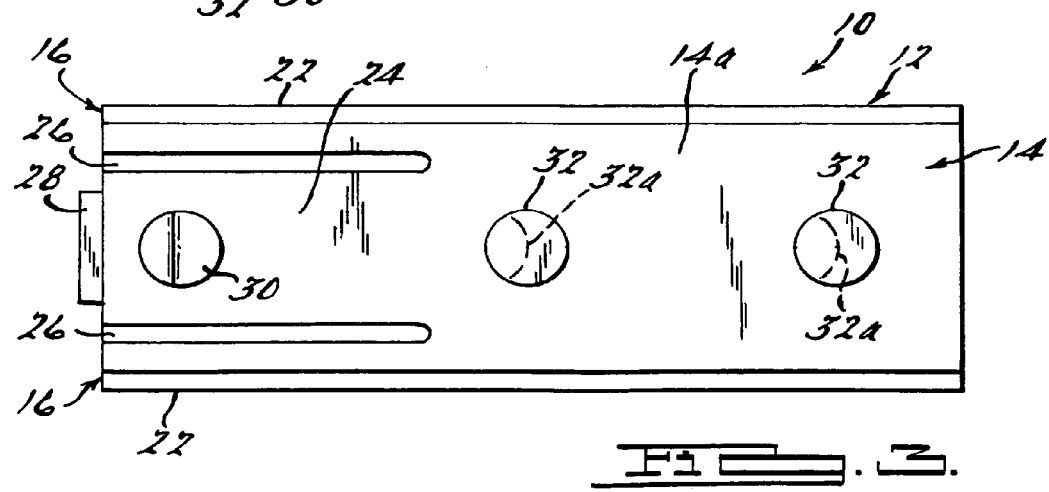
FIG. 3 is a bottom view of the retaining component of FIG. 1.

Referring further to FIGS. 1-3, the retaining component 10 includes a flexible portion 24 formed on the base portion 14. The flexible portion 24 is created by a pair of parallel extending slits 26 that extend from one longitudinal edge of the base portion 14 to form a flexible flap. A release lip 28 is formed on the flexible portion 24, the purpose of which will be described momentarily. On the flexible portion 24, a semi-cylindrical shaped locking tab 30 is formed between the slits 26 and projects outwardly from the flexible portion 24. Also on the base portion 14, a plurality of spaced apart, hook-shaped engaging tabs 32 are formed longitudinally in line with the locking tab 30. Each hooked shape engaging portion 32 includes a leg portion 32a that is preferably somewhat oval shaped, as indicated in FIG. 8, to uniformly engage an edge portion of a circular hole. In the illustrated embodiment, a lower surface 14a of the base portion 14 is planar, but it will be appreciated that this could be altered to match the contour of the seat track (component 34 in FIG. 7) to which the retaining component 10 will be attached. Thus, for example, the base portion 14 could form a concave or convex surface.

Referring to FIG. 4, when the retaining member 10 is to be secured to a seat track 34, the retaining member is aligned such that the hook-shaped engaging tabs 32 are positioned over holes 36 in a flange 38 of the seat track 34. The retaining member 10 is then lowered onto the flange 38 such that the engaging tabs 32 pass through the holes 36. A small amount of pressure, applied to the main body 12 typically by several fingers and the thumb of one hand, in the direction of arrow "A", is required at this point to force the retaining member 10 down against the flange 38 such that the engaging tabs 32 are fully extended through the holes 36. As pressure is applied against the main body 12 in accordance with arrow A, the locking tab 30, which is slightly laterally displaced from its associated hole 40 and in contact with an upper surface 38a of the flange 38, forces the flexible portion 24 to flex upwardly slightly into the channel 20 of the main body as the retaining member 10 is held against the flange 38.

Referring to FIG. 5, as pressure is maintained on the retaining component 10 to hold it flat against the upper surface 38a of the flange 38, the retaining component 10 is slid in the direction of arrow 42. The hook-shaped engaging tabs 32 begin to engage edges 36a of the holes 36 and the locking tab 30 begins to move into the hole 40. In FIG. 6, as sliding movement along the direction of arrow 42 continues while pressure is still being applied to the retaining component 10 along arrow A to hold it against the upper surface 38a of the flange 38, the locking tab 30 snappingly engages the hole 40 at the point that the legs 32a of each of the hook-shaped engaging tabs 32 contact the edges 36a of their respective holes 36. Thus, it will be appreciated that the spacing of the hook-shaped engaging tabs 32 and the locking tab 30 is selected in accordance with the spacing of the holes 36 and 40 in the seat track 34. Typically, the holes in the seat track 34 will be evenly spaced apart and identical in configuration (i.e., shape). The spacing between the locking tab 30 and its nearest engaging tab 32 should be just slightly greater than the spacing of the holes 36 and 40.

While two hook-shaped engaging tabs 32 are illustrated, it will be appreciated that a greater or lesser plurality of such tabs may be employed. Similarly, while only a single locking tab 30 is illustrated in the exemplary embodiment of the retaining component 10, it will be appreciated that two or more locking tabs could also be employed. Once the retaining member 10 is engaged with the seat track 34 shown in FIG. 6, the locking tab 30 prevents lateral movement along the seat track 34, while the hook-shaped engaging tabs 32 prevent the retaining component 10 from being lifted off of the seat track 34.

Referring now to FIG. 7, a mop sill panel 44, typically employed in a cabin interior area of a commercial aircraft 43, is shown secured to the retaining component 10 after the retaining component 10 has been secured to the flange 38 of the seat track 34. It will be appreciated that the seat track 34 may be employed in an aircraft, bus, van, ship, train or virtually any other form of mobile platform, or may even be employed in any type of fixed structure. The retaining member 10 can essentially be used to quickly secure a first component or structure to a second component or structure, where the second component or structure has a plurality of spaced apart holes in a surface thereof. Thus, the retaining member 10 is not limited to use with only seat tracks.

In this example, the mop sill panel 44 includes a pair of flanges 46, 48, together with a top wall 50, that cooperatively form a channel for receiving a portion of the main body 12 of the retaining component 10. The mop sill panel 44 is secured to the retaining component 10 by aligning the flanges 46 and 48 with the flanges 16 of the retaining component 10 and then pressing downwardly on the top wall 50. This causes the flanges 16 to be urged towards one another momentarily as the flanges 46 and 48 are urged over the profiled edges 22 of the flanges 16. The profiled edges 22 of the flanges 16 then snap outwardly into longitudinal grooves 52 and 54 extending along the flanges 46 and 48, respectively. This attachment may be effected by a user simply stepping on the top wall 50 of the mop sill panel 44 after aligning it over the retaining member 10. Typically several retaining components 10 will be secured to the seat track 34 along its length, and the mop sill panel 44 attached to each of the retaining components 10 in successive fashion in the manner described above.

To remove the retaining component 10 from the seat track 34, the mop sill panel 44 is first lifted off of the retaining component 10. This requires at least a small amount of force as the flanges 46 and 48 are lifted off of the flexible flanges 16, thus momentarily urging the flanges 16 towards one another as the profiled edges 22 are disengaged from their respective grooves 52 and 54. Once the mop sill panel 44 is completely removed from the retaining component 10, the user can lift up on the release lip 28 with a fingernail, or with a small implement such as a screwdriver, so that the locking tab 30 is lifted completely out of its associated hole 40 in the seat track 34 (FIGS. 4-6). While the release tab 28 is held in a lifted orientation (essentially in the orientation shown in FIG. 4), the entire retaining component 10 is slid in a direction longitudinally opposite to arrow 42 (i.e., along arrow B in FIG. 6) a small distance until the hook-shaped engaging tabs 32 are centered in their respective holes 36, and are thus free to be lifted completely out of their respective holes 36.

The retaining component 10 thus forms an inexpensive, convenient device for quickly and easily securing various forms of panels and structures to another component having a plurality of holes, and without the use of threaded or rivet style fastening components or external tools. The example provided in the present specification, that being the attachment of a mop sill panel to a seat track, is merely one implementation of the retaining component 10. The retaining component can be used to secure essentially any independent panel or component to another member, where the member has a plurality of spaced apart holes to which the retaining component 10 can be secured.

The retaining component 10 significantly reduces assembly time associated with assembling various panels to the seat tracks in a mobile platform without interfering with the attachment of the seats themselves to the seat tracks. The retaining component 10 can be quickly and easily secured to a seat track, and removed and repositioned along the seat track where needed. Since the retaining component 10 is preferably made from a lightweight, high strength material, such as plastic, the retaining component itself adds little weight to the mobile platform in which it is employed. The elimination of the need for threaded or rivet style fasteners, or any other type of fastener, also contributes to reducing the overall weight of the mobile platform when the retaining component 10 is employed.

While various embodiments have been described, those skilled in the art will recognize modifications or variations which might be made without departing from the inventive concept. The examples described herein are not intended to limit the present disclosure. Therefore, the description and claims should be interpreted liberally with only such limitation as is necessary in view of the pertinent prior art.

What is claimed is:

1. A retaining component coupling a first element to a second element, wherein the second element has a first opening and a second opening spaced apart from one another, the retaining component comprising:
   a main body including a base portion;
   said main body including a pair of flexible flanges extending from said base portion and comprising opposing inner walls defining a channel extending along a longitudinal axis of said main body therebetween;
   said base portion including:
      a generally planar surface including at least one engaging tab projecting therefrom opposite said channel for engaging within said first opening in said second element, and
      a flexible portion formed from a pair of longitudinally extending slits in said generally planar surface at an end of said channel longitudinally spaced from said engaging tab, said flexible portion having a locking tab adapted to flex inwardly into said channel to enable said engaging tab to engage within said first opening, and then allow said locking tab to snappingly engage within said second opening in said second element as said main body is slid longitudinally along said second element;
   wherein outer walls of said flexible flanges flex inwardly toward each other to enable a portion of said first element to be secured on an outer surface of said main body along said longitudinal axis thereto; and
   wherein said flexible portion, said locking tab and said engaging tab are all formed to extend in alignment with said longitudinal axis.

2. The component of claim 1, wherein said engaging tab comprises a hook-shaped element.

3. The component of claim 1, wherein said locking tab comprises a cylindrically shaped element.

4. The component of claim 1, wherein said locking tab comprises a protruding release lip for enabling a user to manually engage said flexible portion with a finger or tool, and to lift said flexible portion to disengage said locking tab from said second element when said component is to be removed from said first element.

5. The component of claim 1, wherein said main body comprises plastic.

6. A retaining component coupling a first member to a second member without independent threaded or rivet style fastening elements, the second member including a first opening spaced apart from a second opening, the retaining component comprising:
   an integrally formed main body, the main body including:
      an elongated channel formed by a pair of opposing, flexible flanges, opposing inner walls of the flexible flanges defining said channel extending along a longitudinal axis of said main body therebetween;
      a generally planar base portion extending between portions of said flanges;
      said base portion including a generally planar surface having at least one engaging tab and a locking tab each protruding from said surface of said base portion opposite said channel;
      said engaging tab being formed in a shape to engage within said first opening in said second member when said base portion is placed against said second member; and
      said base portion including a coplanar flexible flap formed at one longitudinal end of said base portion longitudinally spaced from said engaging tab by a pair of longitudinally extending slits, said locking tab being disposed on said flexible flap and adapted to flex inwardly into said channel to enable said locking tab to engage in said second opening in said second member as said base portion is moved longitudinally along said second member while said engaging tab is engaged within said first opening;

wherein outer walls of said flexible flanges flex inwardly toward each other to enable said first member to be snappingly engaged on an outer surface of said main body along said longitudinal axis thereto; and wherein said flexible flap, said engaging tab and said locking tab are all formed in alignment with said longitudinal axis.

7. The component of claim 6, further comprising a plurality of said engaging tabs.

8. The component of claim 7, wherein said engaging tabs each comprise a hook shape.

9. The component of claim 6, wherein said surface of said base portion is planar and contoured to mate with said second member.

10. The component of claim 6, wherein said component comprises an integrally formed plastic component.

11. The component of claim 6, wherein said slits are formed parallel to one another.

12. The component of claim 11, wherein said slits extend to one longitudinal edge of said base portion.

13. The component of claim 6, wherein said base portion includes a release lip that can be manually engaged by a user to lift said locking tab out of said second opening when said component is being removed from said second member.

14. A retaining component holding a member to a seat track on a mobile platform without the need for threaded or rivet style fasteners, wherein the seat track has first and second openings spaced apart from one another, the retaining component comprising:

an integrally formed, plastic main body, the main body including:

a generally planar base portion;

a pair of flanges extending from said base portion and, together with said base portion, opposing inner walls of said flanges forming a channel, said channel extending along a longitudinal axis for said main body, said flanges further being flexible so as to flex inwardly toward each other to enable a portion of said member to be secured on outer walls of said flanges to secure said member on an outer surface of said main body along said longitudinal axis thereto;

said base portion further including at least one hook-shaped engaging tab, and a locking tab, both projecting from a common surface of said base portion opposite said channel, and adapted to engage said first and second openings in said seat track when said base portion is placed against said seat track and moved slidably therealong; and a section of said base portion including a flexible portion on which said locking tab is formed, said flexible portion being formed by a pair of longitudinally extending slits in said base portion at an end of said channel longitudinally spaced from said engaging tab, said flexible portion flexing inwardly into said channel as said main body is moved slidably along said seat track to enable said locking tab to be snappingly engaged within said second opening while said engaging tab is engaged within said first opening, such that said retaining component is adapted to lock said main body to said seat track; and wherein said engaging tab, said locking tab and said flexible portion are all formed in alignment with said longitudinal axis.

15. The component of claim 14, wherein said slits extend to one longitudinal edge of said base portion.

16. The component of claim 15, wherein said locking tab is formed on said flexible portion in between said slits.

* * * * *